United States Patent Office 3,450,645
Patented June 17, 1969

3,450,645
CONTACT MASSES CONTAINING ZEOLITE
James E. McEvoy, Morton, Pa., assignor to Air Products and Chemicals, Inc., Philadelphia, Pa., a corporation of Delaware
No Drawing. Filed June 2, 1966, Ser. No. 554,687
Int. Cl. B01j *11/58*
U.S. Cl. 252—455          5 Claims

ABSTRACT OF THE DISCLOSURE

Raw kaolin is calcined at 1850° F. to prepare 1 part of reactive material, which is dispersed in 1.2 parts of 16.7% aqueous sodium hydroxide and aged at ambient temperature for 1.5 days. Then 2 parts of raw kaolin and 0.2 part of water are added to provide a dough extrudable into cylindrical pellets. The pellets are aged in 200° F. oil for a day, ammonium exchanged, and steamed at 1350° F. to provide catalyst particles having outstanding attrition resistance. Such particles contain hydrogen faujasite and the activity-selectivity characteristics of this type of cracking catalyst. Matrix components which have substantially less reactivity with caustic than the initial zeolite-forming precursors are introduced after the cold aging and prior to hot aging in synthesizing many varieties of particles of crystalline zeolite in a matrix.

---

This application is concerned with a method for the preparation of contact masses containing crystalline zeolite and more particularly is concerned with the preparation of such contact masses with "in situ" synthesis of at least a portion of the crystalline zeolite.

The use of contact masses having special functions is an art of long standing and wide variety in fields including catalysis, gas conditioning, special filtrations, and many others. A wide variety of contact masses have been developed to have more or less specialized functions, particularly adapting such masses to specialized uses. It has been found that in certain areas contact masses comprising zeolites have shown desirable qualities in a variety of fields including those benefiting from molecular sieve separation methods and in the catalysis of a variety of reactions, one notably being the catalytic conversion of hydrocarbons. Zeolite-containing contact masses have been known and available to the hydrocarbon refining industry for many years and have over the years been the subject of much thought and work directed to improving one or more functions of such contact masses.

It has now been found that contact masses comprising crystalline zeolite can be prepared in a particular way imparting to the final contact mass certain desirable attributes. These attributes include certain desirable physical characteristics including a degree of physical strength assuring a long useful life in relatively severe physical environments of high temperature, abrasive conditions, frequent sharp impacts and others. Likewise the materials prepared in accordance with the new system have special attributes in certain areas, such as in hydrocarbon conversions and in gas treating systems, particularly adapting such contact masses to a desirable and profitable commerical utility. A further advantage resides in simplification of the preparation of such contact masses in that there is a substantial reduction in the bulk of materials processed during an appreciable portion of the preparation procedure.

In accordance with this invention a zeolitic precursor composition is subjected to a first stage necessary to the formation of crystalline zeolite without however, being extensive enough to form all of the crystalline zeolite comprising the final contact mass composition; subsequent to this first stage treatment a suitable quantity and quality of an argillaceous substance serving mainly as a matrix for the ultimate zeolitic portion of the contact mass is added and thoroughly admixed with the product from the first stage treatment; and thereafter this admixture is subjected to a further zeolite-forming set of conditions in which the desired quantity and quality of polyhedral crystalline zeolite is formed in the presence of the matrix. Subsequently, treatment of the product from this last stage of treatment may be such as is required to develop the desired qualities of the contact mass.

The formation of the crystalline zeolite per se forms no part of this invention other than in providing the zeolitic portion of the contact mass herein described. In general the crystalline zeolite formation procedure may be similar to published information in the technical and patent literature. Broadly this method comprises admixture of zeolite-forming precursor materials consisting of appropriate sources of silicon and aluminum in aqueous caustic, subjecting the admixture to an extended aging period in the range of 5 hours to 5 days at a temperature in the range from above freezing to no higher than about 50° C., e.g., about ambient temperature conditions, and thereafter further aging such material at an elevated temperature in the range of from above about 75° C. to a temperature of about the boiling point of the composition for an extended period again in the range of about 5 hours to 5 days while preventing any substantial decrease in the quantity of liquid in the aging composition. By the selection of the proper ingredients and in the proper quantities such a method of operation can produce a controlled variety of zeolites having a range of crystalline structures which may differ in one or more aspects including results obtained during their use.

This invention contemplates the possibility of preparing any one or more of a relatively large selection of crystalline zeolitic-type materials and association thereof with an appropriate matrix material in providing contact masses capable of use in a number of systems. Inasmuch as one of the largest commercial uses of such contact masses is in the catalysis of hydrocarbon reactions, such as in the catalytic cracking of higher boiling petroleum compounds to lower boiling compounds, the following description is directed generally to the preparation of contact masses suitable as catalysts for petroleum refining. It is to be understood that the description and the following examples are illustrative without of necessity limiting the nature and scope of the inventive principle. For a better understanding of this invention attention is directed to the following examples.

EXAMPLE I

A zeolite precursor composition was prepared by admixing 156 grams of alumina trihydrate, 708 grams of commercially available "Hi-Sil 233" (precipitated silica which is about 89% $SiO_2$), 336 grams of sodium hydroxide, and 1775 grams of water. The caustic was dissolved in the water and the alumina was added to the heated solution which was thereafter allowed to cool to room temperature. The Hi-Sil was then added with vigorous stirring. The admixed composition was allowed to age for 24½ hours at room temperature.

To the pan of a Lancaster mixer 3.26 kilograms of bleached Avery kaolin clay from Spruce Pine, N.C., was added. The mixer was started and the above-aged composition was added along with an additional 50 grams of water. Mixing was continued for one-half hour. The mixture was then transferred to a Welding Engineers extruder fitted with a 4 mm. die plate. The mixture was extruded and the strands cut into approximately 4 mm. lengths, forming pellets which were immersed in a heavy oil. The temperature of the oil and the pellets was raised to 200° F. and held at temperature for 24 hours.

The aged pellets were then removed from the oil and washed several times with water to separate out the bulk of the denning oil. The washed pellets were then based exchanged to remove sodium by 10 successive two-hour treats with 2 volumes per treat of 20% $NH_4NO_3$ solution. The base-exchange treatment was followed by a thorough water washing involving 10 successive one-hour treats with 2 volumes per wash of distilled water. The pellets were then dried at 250° F. for 2 hours in an oven. Three 500 cc. samples of the dried pellets were heat treated at separate conditions. Sample A was treated at conditions including a temperature of 1350° F. for 4 hours in an atmosphere of stream. Sample B was treated at conditions including 1500° F. for 4 hours in an atmosphere of steam. Sample C was treated at conditions including 1550° F. for 4 hours in an atmosphere of steam.

To evaluate the catalytic properties of these samples use was made of a standard procedure for measuring cracking activity, noting the results obtained upon cracking a standard gas oil at a selected set of standard conditions. Such a standard test procedure is described in Ser. No. 346,091, now U.S. Patent 3,337,474, which test procedure is herein incorporated by reference.

The results were as follows:

|  | Gasoline, vol. percent | Coke, wt. percent | Gas, wt. percent | Gas, gravity |
|---|---|---|---|---|
| Sample A | 36.2 | 2.2 | 8.1 | 1.39 |
| Sample B | 28.8 | 1.5 | 5.6 | 1.24 |
| Sample C | 25.9 | 1.1 | 4.4 | 1.22 |

Chemical analysis of the dried pellets from the base exchange treatment shows the presence of 0.37 weight percent sodium as $Na_2O$. Analysis of the crystalline zeolite content of the dried pellets by a standard X-ray diffraction procedure shows the presence of 9% of cubo-octahedron-structured crystallites having 3.6 to 1 silica to alumina mol ratio. Other preparations of similar nature have shown that compositions with the zeolite component having a silica to alumina ratio of less than 3.5 to 1 have relatively little advantage in cracking catalysts.

EXAMPLE II

A contact mass was prepared in substantially the same manner and from the precursor materials described in Example I. The zeolite precursor composition was in the proportions of $10Na_2O \cdot 4Al_2O_3 \cdot 20SiO_2 \cdot 400H_2O$. The precursor was aged at room temperature for 22 hours. After aging, the precursor material was admixed by mulling with approximately twice the weight of precursor material of a high grade Georgia kaolin, extruded, formed into pellets and immersed in denning oil. Temperature of the oil bath and the content of pellets was raised to 200° F. and maintained, under cover to prevent any substantial loss of moisture from the system, at temperature for 24 hours. The thus aged pellets were separated from the denning oil, base exchanged, washed and dried. Chemical analysis of the dried material shows the presence of 0.44 weight percent sodium as $Na_2O$. X-ray diffraction measurements indicate the presence of 9% of cubo-octahedron crystalline-structured material mainly classifiable as faujasite. The calcined material has hardness characteristics in excess of minimum commercial requirements as well as hydrocarbon conversion activity and stability considerably better than some commercially available hydrocarbon conversion catalysts.

Instead of using alumina trihydrate and silica as the starting materials for preparing the zeolitic precursor, one may employ a suitable naturally occurring mineral as source for either or both the silica and alumina. Thus, suitable precursors for preparation of sodium zeolite having a $SiO_2/Al_2O_3$ mol ratio of at least 2.5, and preferably in the range of 3 to 6, are obtained by reacting a suitably calcined, natural clay-derived aluminum disilicate, such as kaolin or halloysite, with aqueous caustic in required proportions. For example, it has been found that kaolin calcined in the temperature range of about 1770 to 2000° F. and preferably at or above 1850° F. reacts with aqueous sodium hydroxide to form a nutrient solution, which solution, subjected to appropriate aging and crystallizing conditions, yields a crystalline structure identified by X-ray diffraction patterns as sodium faujasite. Such nutrient composition can be employed as the zeolitic precursor material in practice of the present invention.

When kaolin is calcined at a temperature in the range of 700–1000° F. some of the hydrate water is driven off and the calcined product has a form known as meta kaolin. The components in meta kaolin have solubility in aqueous caustic differing from either the raw kaolin or the higher-temperature calcined material. If meta kaolin is reacted with sodium hydroxide in the absence of added silica, crystalline zeolites can be obtained having a $SiO_2/Al_2O_3$ mol ratio of about 2:1 consistent with the contents of these components in the starting kaolin ($Al_2O_3 \cdot 2SiO_2 \cdot xH_2O$). On the other hand when starting with highly calcined kaolins heated above the range resulting in conversion to meta kaolin, reaction with aqueous sodium hydroxide under appropriate conditions leads to formation of sodium zeolites having a $SiO_2/Al_2O_3$ ratio of 2.5 or more without addition of extraneous silica. Without being bound to any particular theory, it is postulated that at the higher temperatures a portion of the aluminum silicate in the kaolin structure is converted to mullite ($3Al_2O_3 \cdot 2SiO_2$), thereby releasing free silica or silica in a complex or combined form reacting as free silica; other parts of the original kaolin structure are converted by the calcination to an aluminum disilicate form reactive with caustic, perhaps similar to meta kaolin.

EXAMPLE III

Certain tests were conductued, not for the purpose of fulfilling the claimed invention, but to demonstrate the suitability of 1830–1880° F. calcined kaolin for the synthesis of sodium faujasite.

(a) A high temperature calcined kaolin, calcined in the range of about 1830° to 1880 F., was admixed with aqueous caustic in proportions furnishing 62.6 parts by weight calcined kaolin, 15.5 parts NaOH, and 73 parts water. A portion of the mixture was aged in denning oil at 37° C. for 40 hours. It was found that this reaction mixture was a suitable nutrient medium serving as a precursor for sodium faujasite without further addition of silica.

(b) The denning oil containing the cold-aged reaction mixture was then heated to approximately 100° C. and held at temperature for 24 hours. The solids were separated from the denning oil, thoroughly washed and then dried overnight at 120–130° C.

X-ray analysis of the dried and comminuted material from (b) above showed the presence of about 25% faujasite having a silica alumina ratio of about 3.7/1.

EXAMPLE IV

For preparation of a matrix-associated zeolite from a precursor similar to that described in Example III above, the following procedure is used:

A catalytic grade (i.e., screened, washed and having an iron content less than 0.4 weight percent as $Fe_2O_3$) of naturally occurring kaolin is calcined in a stream of flowing air at a temperature of 1850° F. for two hours. After cooling to about room temperature, the calcined clay is admixed with aqueous caustic in proportions to form a composition having by weight 5 parts of calcined clay, 5 parts of water and 1 part of sodium hydroxide. This admixture is allowed to age for a day and a half at substantially room temperature after a slight rise in temperature following admixture resulting from an exothermic reaction of the clay with the aqueous caustic.

The aged material is then admixed by mulling with 10 parts by weight of the same catalytic grade kaolin described above but lacking the calcination treatment. This uncalcined clay is substantially less reactive with caustic. During the course of the mulling an additional 1 part by weight of water is added to adjust the consistency of the mulled mixture to an extrudable mass.

The mulled material is transferred to an auger extruder with a face plate having 5/32 inch holes. The material is extruded in 5/32 inch strands and cut by a doctor blade is cylinders having approximately the same length as diameter. The cylinders are introdduced into a high boiling and relatively inert oil bath to aid in keeping the semi-plastic freshly extruded particles from adhering to each other and to provide a convenient environment for the ensuring treatment.

The oil bath containing the cylinders is heated to a temperature of about 200° F. and maintained at temperature for 24 hours, and then cooled to room temperature. The cylinders are recovered from the oil bath and washed until substantially free of oil and water-soluble salts.

A sample portion of the washed material thus obtained is dried, ground, equilibrated on moisture content in a 50% relatively humidity atmosphere and then subjected to X-ray analysis. By comparison of X-ray data obtained in analysis of the test sample with similarly-obtained X-ray data on samples of known composition and concentration, it is shown that the tested sample comprises a kaolin matrix containing approximately 24% zeolite having a cubo-octahedron crystalline structure identifiable as sodium faujasite, with a silica to alumina ratio of 4.2 to 1.

The remaining portion of the washed cylinders is treated with an aqueous ammonium nitrate solution to effect removal of most of the zeolitically held sodium. The treatment consists of seven successive treats, each of twice the volume of the solids and of two hours' immersion time in fresh 10% $NH_4NO_3$ solution with occasional stirring followed by draining. The thus base-exchanged cylinders are washed with distilled water until substantially free of water soluble salts and then dried at 250° F. for two hours in an oven. Chemical analysis of a portion of the dried cylinders shows the presence of 0.58% sodium as $Na_2O$.

To test the catalytic activity and heat stability of this material the dried cylinders are divided into three equal portions and then calcined at separate conditions. Sample D calcination conditions include temperature of 1350° F. for two hours in an atmosphere of flowing dry air. Sample E calcination conditions include temperature of 1500° F. for four hours in an atmosphere of steam. Sample F calcination conditions include a temperature of 1550° F. for four hours in an atmosphere of steam.

To evaluate the catalytic properties of these samples use is made of a standard procedure for measuring cracking activity, as described in Example I.

Typical results of such tests on these samples are tabulated below:

| | Vol. percent Gasoline | Wt. percent Coke | Wt. percent Gas | Gas, gravity |
|---|---|---|---|---|
| Sample D | 62 | 6.2 | 28.5 | 1.62 |
| Sample E | 67 | 2.3 | 15.9 | 1.59 |
| Sample F | 63 | 1.9 | 11.8 | 1.60 |

These values show a high order of catalytic activity coupled with considerable stability of such activity against material deterioration by high temperatures and the presence of steam employed in the heat treatment of Sample E and Sample F.

EXAMPLE V

A commercially available sodium-form synthetic faujasite of the type marketed as sodium "zeolite Y" in an amount calculated as equivalent to 10% by weight of the final catalyst is admixed with a zeolite precursor composition. The precursor composition is made up by admixing 4.75 parts by weight of 1900° F. calcined Georgia kaolin with aqueous caustic solution composed of 1 part by weight NaOH and 5 parts by weight water. The complete admixture is aged at 10–15° C. for 36 hours. A very small portion of the aged material is separated, freed of soluble salts and dried. X-ray diffraction analysis shows substantially only the amount and form of the synthetic faujasite originally incorporated in the precursor material.

The balance of the aged material containing the precursor composition is admixed by mulling with 5 parts by weight of raw Georgia kaolin and an additional 1.25 parts by weight of water. The mixture is extruded through a 4 mm. die plate and the strands are cut into pellets of approximately 4 mm. length and immersed in denning oil. The oil temperature is raised to 205° F. and held at temperature for 35 hours under cover to minimize moisture loss. The thus-aged pellets are separated from the denning oil and subjected to base-exchange removal of the bulk of sodium ion by eight successive two hour treats, each using two volumes of 10% ammonium nitrate solution at 80° C. for each volume of pellets. The base-exchanged pellets are water-washed and dried for 2 hours at 250° F. in a gas-fired oven.

Chemical analysis of the dried material shows 0.63 weight percent sodium as $Na_2O$ and 0.25 weight percent iron as $Fe_2O_3$. The X-ray diffraction analysis shows the presence of 18% crystalline zeolite of substantially only cubo-octahedron structure substantially the same in form as the originally introduced synthetic faujasite and indistinguishable therefrom.

Portions of the dried pellets, heat treated at conditions similar to those described in Example I, upon subsequent testing demonstrate physical and catalytic characteristics superior to many commercially available catalyst compositions. For instance, the sample after treatment at 1500° F. for four hours in the 100% steam atmosphere shows, by the above-described standard test for catalytic effectiveness, conversion of 77 weight percent of the hydrocarbon charge with 83 weight percent selectivity to gasoline boiling-range product. Porosimeter tests on this sample indicate the presence of an appreciable amount of porosity contributed by pores of greater than 11 A. in diameter and largely attributable to the crystalline zeolite.

It is to be understood that formulations are flexible within the sense of this invention. The precursor composition may use synthetic or natural compositions providing the silicon and aluminum atoms forming the final crystalline zeolitic component. It is of course necessary to have such components available in suitable concentration susceptible to the alkaline environment and treating conditions to form the polyhedral crystalline zeolite having the minimum silica to alumina ratio of 2.5 to 1. Likewise, as determined through results in related work the amount of such crystalline zeolite to be effetcive in the final contact mass should be no less than the equivalent of 5% of the final material. Further, it is contemplated that the alkaline environment may be provided in entirety by sodium hydroxide; or in part by sodium hydroxide in conjunction with suitable NaOH-equivalent quantities of basic materials, such as other alkali metal and alkaline earth metal hydroxides, or appropriate organic bases.

The matrix argillaceous material may be any of many natural or synthetic materials acting as support and binder material in a manner similar to the various hereinabove described kaolin clays which contain less than 1.0% iron as $Fe_2O_3$. Other plastic kaolins, halloysites, pyrophyllite, low-soda montmorillonites and others may be employed as long as they perform the desired functions without contributing any material detrimental side effects to the desired final contact mass. Such contact masses have utility in a variety of systems in addition to hydrocarbon cracking systems. Such other systems include other hydrocarbon refining operations, gas treating for purification or dehumidification, selective filtration and others. Likewise the utility of the contact masses herein contemplated may be further expended by suitable subsequent modification as in the introduction therein of catalytically active components for preparation of catalysts suitable for hydrocracking or the like.

Obviously, many modifications and variations of the invention as hereinbefore set forth may be made without-departing from the spirit and scope thereof, and therefore only such limitations should be imposed as are indicated in the appended claims.

What is claimed is:

1. In the preparation of hydrocarbon conversion catalyst comprising crystalline zeolite composed mainly of silicon, oxygen, and aluminum atoms in a polyhedral crystalline configuration and having a silica to alumina ratio of at least 2.5:1, the zeolite being in association with an argillaceous matrix, said catalysts being prepared by a process including the steps of:

(A) forming zeolite-precursor composition including sodium hydroxide, water, silica and alumina;

(B) aging the composition at a temperature in the range from above freezing to no higher than about 50° C. for a time period in the range of 5 hours to 5 days, and thereafter, (C) further aging at a temperature in the range of from above about 75° C. to a temperature of about the boiling point of the composition while preventing any substantial decrease in the quantity of liquid in the aging composition, thereby forming from the aged composition matrix-associated sodium-form zeolite, and (D) converting the latter by suitable treatment to a zeolitic composition catalytically effective in conversion of hydrocarbons; the improvement which comprises the steps of admixing (a) zeolite- precursor composition which has been aged at a temperature no higher than about 50° C. for a time period in the range of 5 hours to 5 days, with (b) an argillaceous matrix material and forming therefrom a mass of extrudable consistency, forming said last-mentioned mass into discrete particles, subjecting said particles to the above-defined further aging including conditions of a temperature above about 75° C. for a time period in the range of 5 hours to 5 days and forming thereby discrete particles comprising sodium-form zeolite having a silica to alumina ratio of at least 2.5 to 1 in an argillaceous matrix, and subjecting said last-mentioned discrete particles to said treatment D for converting the same to a zeolite-containing composition catalytically effective in conversion of hydrocarbons.

2. The method of preparing a contact mass comprising an argillaceous matrix containing crystalline zeolite of the faujasite type having a silica to alumina mol ratio of at least 2.5 to 1 and having a measurable amount of porosity contributed by pores having dimensions of at least 11 A. in diameter, such method comprising forming a composition consisting at least in part of zeolite-forming precursors, subjecting such composition to a first treatment at a set of conditions necessary to the formation of the zeolite and insufficient to complete the formation of the zeolite comprising the final contact mass, admixing the product of said first treatment and an argillaceous component having qualities suitable as a matrix in the final contact mass, said argillaceous component being substantially less reactive with caustic than said zeolite-forming precursors, subjecting such admixture to a second treatment at a set of conditions necessary to complete formation of the zeolite comprising the final contact mass, and treating the product of said second treatment to provide a contact mass comprising an argillaceous matrix containing crystalline faujasite.

3. A contact mass comprising an effective amount of crystalline zeolite predominantly configured of silicon, oxygen and aluminum atoms and an amount of associated argillaceous matrix, said contact mass having been prepared by a process in which at least some and less than all of zeolite formation has been effected from zeolite precursor prior to addition of at least part of said argillaceous matrix, and thereafter in the presence of added matrix having been subjected to conditions forming zeolite in excess of any zeolite formation prior to said addition.

4. A contact mass prepared in accordance with claim 3 wherein said zeolite precursor consists of alkali-soluble silica, alkali-soluble alumina, alkali and water.

5. A contact mass prepared in accordance with claim 3 wherein said zeolite precursor includes, as the primary source of silicon and aluminum atoms, calcined kaolin containing less than 1.0% iron as $Fe_2O_3$, said kaolin having been calcined at a temperature within the range from about 1830° F. to about 1880° F.

References Cited

UNITED STATES PATENTS

| | | | |
|---|---|---|---|
| 3,325,398 | 6/1967 | Ashwill | 252—455 X |
| 3,329,628 | 7/1967 | Gladrow et al. | 252—455 X |
| 3,341,284 | 9/1967 | Young | 252—455 X |

DANIEL E. WYMAN, *Primary Examiner.*

C. F. DEES, *Assistant Examiner.*

UNITED STATES PATENT OFFICE
CERTIFICATE OF CORRECTION

Patent No. 3,450,645

June 17, 1969

James E. McEvoy

It is certified that error appears in the above identified patent and that said Letters Patent are hereby corrected as shown below:

Column 3, line 15, "stream" should read -- steam --. Column 4, line 43, "1880" should read -- 1880° --. Column 5, line 23, "on" should read -- in --; line 24, "relatively" should read -- relative --. Column 6, line 13, "mixture" should read -- admixture --.

Signed and sealed this 5th day of May 1970.

(SEAL)
Attest:

Edward M. Fletcher, Jr.
Attesting Officer

WILLIAM E. SCHUYLER, JR.
Commissioner of Patents